United States Patent Office 3,434,688
Patented Mar. 25, 1969

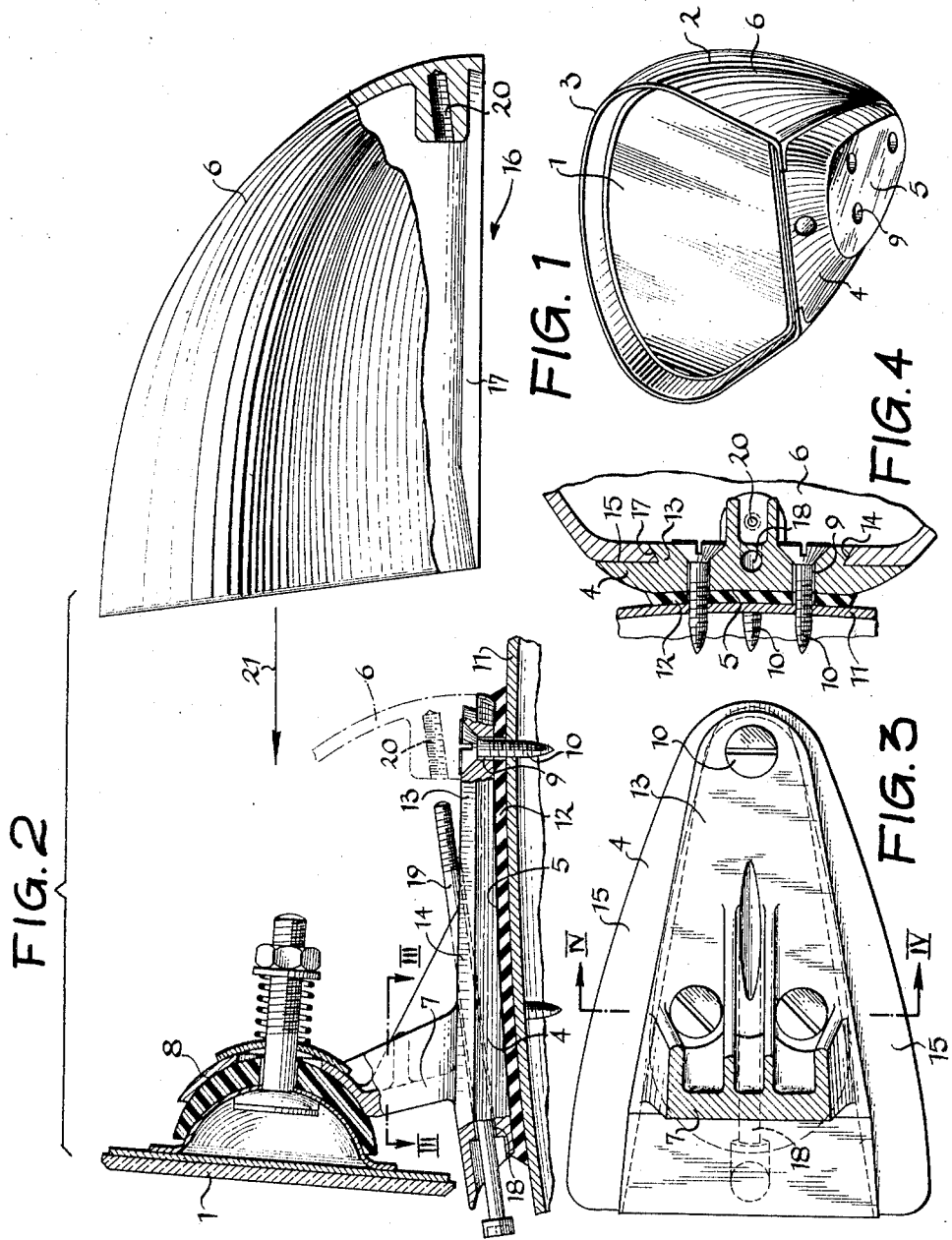

3,434,688
ADJUSTABLE SIDE VIEW MIRROR
Joachim Engelmann, 3002 Wennebostel 57,
Hannover, Germany
Filed Oct. 18, 1966, Ser. No. 587,468
Claims priority, application Germany, Oct. 25, 1965,
E 30,357
Int. Cl. B60r 1/06
U.S. Cl. 248—483                        6 Claims

ABSTRACT OF THE DISCLOSURE

A side rear view mirror for motor vehicles, in which the housing encasing the mirror structure is composed of a bottom member detachably connected to the motor vehicle and carrying said mirror structure and of a shell member open at its front and at its bottom and detachably connected to said bottom member for closing the open bottom portion of said shell member.

---

The present invention relates to an adjustable side view mirror for vehicles, in which the mirror body is arranged in a streamlined housing adapted by screws or similar connecting means to be connected to the outside of the vehicle.

It is an object of this invention to provide a side view mirror of the above mentioned general character in which the mirror body will be so arranged in the housing that accidental adjustments of the mirror body will be impossible.

It is another object of this invention to provide a side view mirror, as set forth in the preceding paragraph, in which all connecting means for connecting the side view mirror to the outside of the vehicle can be applied from the outside of the vehicle wall.

These and other objects and advantages of the invention will appear more clearly from the following specification in connection with the accompanying drawing, in which:

FIGURE 1 illustrates a perspective view of a side view mirror according to the present invention in non-mounted condition.

FIGURE 2 is an explosive view of the side view mirror according to the invention showing the housing body partially in section with the holding means for the mirror body and showing the housing body fixedly connected to the vehicle wall.

FIGURE 3 is a section taken along the line III—III of FIG. 2.

FIGURE 4 is a section taken along the line IV—IV of FIG. 3.

According to the present invention, the mirror body is arranged in spaced relationship to the rim of the housing and is adjustable in said housing with regard to its rigid connection to the vehicle wall. The housing body is provided with connecting means for connection to the vehicle wall, while the remaining portion of the housing is detachably connected to the housing bottom. Advantageously, the housing body is also provided with holding means for adjustably mounting the mirror body. When a side view mirror according to the invention is to be connected to a vehicle, first the housing body is connected to the vehicle wall by screws or the like which can be screwed from the outside through the housing body into the wall of the vehicle. After the housing body, preferably with the holding means for the mirror body has been fixedly connected to the vehicle, the remaining portion of the housing is connected to the housing body so that the mirror body is then properly protected and located within the housing.

Referring more specifically to the drawing, it will be noted from FIG. 1, that the mirror body 1 is located within a streamlined housing 2 in spaced relationship to the rim 3 of the housing opening.

Housing 2 is a two-sectional housing comprising a housing bottom 4 with a plane bottom surface 5, and also comprising a shell 6 representing the remaining portion of the housing 2. The upper surface of housing bottom 4 has fixedly connected thereto an arm 7 which may also form an integral piece with said housing bottom 4. The mirror 1 is by means of a ball joint 8 tiltably journalled on said arm 7 so that the mirror body 1 in assembled condition of the side view mirror can be tilted in the desired direction by pressing, for instance, with the finger on said mirror body.

Housing body 4 is provided with bores 9 for receiving corresponding metal screws 10 adapted to be screwed into the wall 11 of the vehicle. If desired, a sealing plate 12, for instance, of rubber material, may be provided between the housing body 4 and the vehicle wall 11.

As will furthermore be evident from the drawing, the housing body 4 is provided with an elevation or protrusion 13 extending in the longitudinal direction of the housing bottom 4. The said elevation or protrusion 13 is laterally undercut and its width tapers toward the rear end of the housing body 4.

The lateral undercut portions form inclined surfaces 14 which in view of the shape of the protrusion 13, taper toward the rear in a V-shaped manner. At both sides of said surfaces 7 there are plane supporting surfaces 15 (FIG. 3).

The bottom side of shell 6 is provided with a recess 16 which is laterally confined by inclined engaging surfaces 17, which are likewise V-shaped with regard to each other but are inclined in the opposite direction with regard to surfaces 14 so as to slidably fit thereon. Housing body 14 has an inclined bore 18 for receiving screw 19, adapted to be screwed into a threaded bore 20 at the rear end of shell 6.

For purposes of mounting the side view mirror, first the housing body 4 is by means of screws 10, adapted to be applied from the outside, connected to the vehicle. Thereupon, the shell 6 is slipped onto the housing body 4 in the direction of the arrow 21 by causing the inclined surfaces 17 of the housing section or shell 6 to slidably engage the inclined surfaces 14 of the housing bottom 4. By tightening screw 16, shell 6 is properly drawn onto the inclined surfaces 14 so that a dovetail connection according to FIG. 4 is obtained while shell 6 also engages the surfaces 15.

As will be evident from FIGS. 1 and 4, the outer contour of the housing bottom 4 merges with the outer contour of shell 6. It is, of course, to be understood that the present invention is, by no means, limited to the particular construction shown in the drawing, but also comprises any modifications within the scope of the appended claims.

What I claim is:

1. A side view mirror for motor vehicles, which includes: a two-sectional housing comprising a bottom member as first section and a shell member as second section, said shell member being open at its front end and also at its bottom portion and being closed at its rear end, said shell member having means for detachably connecting said shell member to said bottom member to close the open bottom portion of said shell member; universal joint means supported by one of said sectional housing members and arranged within said housing; and a mirror body adjustably supported by said universal joint means in spaced relationship to said open front end of said shell member; said bottom member having means thereon detachably connecting said bottom member to a vehicle wall from the outside thereof.

2. A side view mirror according to claim 1, in which said universal joint means is supported by said bottom member.

3. A side view mirror according to claim 1, in which said shell member positively engages said bottom member.

4. A side view mirror according to claim 1, in which said means connecting said shell member and bottom member comprises undercut surfaces, and in which the bottom end of said shell member is provided with sliding surfaces for slidably and detachably engaging said undercut lateral surfaces so as to form therewith a dovetail connection.

5. A side view mirror according to claim 1, in which the means for detachably connecting said bottom member to said shell member comprises a rearwardly tapering elevation on said bottom member and in which the bottom end of said shell member is tapered correspondingly for detachable and slidable wedge-like engagement with said elevation.

6. A side view mirror according to claim 5, in which the rear end of said shell member is provided with a threaded bore, and in which said bottom member is provided with a rotatable but axially non-displaceable screw extending in the longitudinal direction of said tapering elevation for threadedly engaging said threaded bore of said shell member and tightly pulling the latter onto said tapering elevation.

References Cited

UNITED STATES PATENTS

| 1,970,473 | 8/1934 | Parker | 248—225 |
| 2,629,286 | 2/1953 | Budreck | 248—483 |
| 3,337,177 | 8/1967 | Talbot | 248—483 |

FOREIGN PATENTS

| 486,346 | 6/1938 | Great Britain. |
| 617,645 | 2/1961 | Italy. |

CHANCELLOR E. HARRIS, *Primary Examiner.*

J. F. FOSS, *Assistant Examiner.*

U.S. Cl. X.R.

248—225, 278